June 3, 1958
H. NUTT
2,837,069
VARIABLE SPEED FAN DRIVE
Filed Nov. 30, 1956
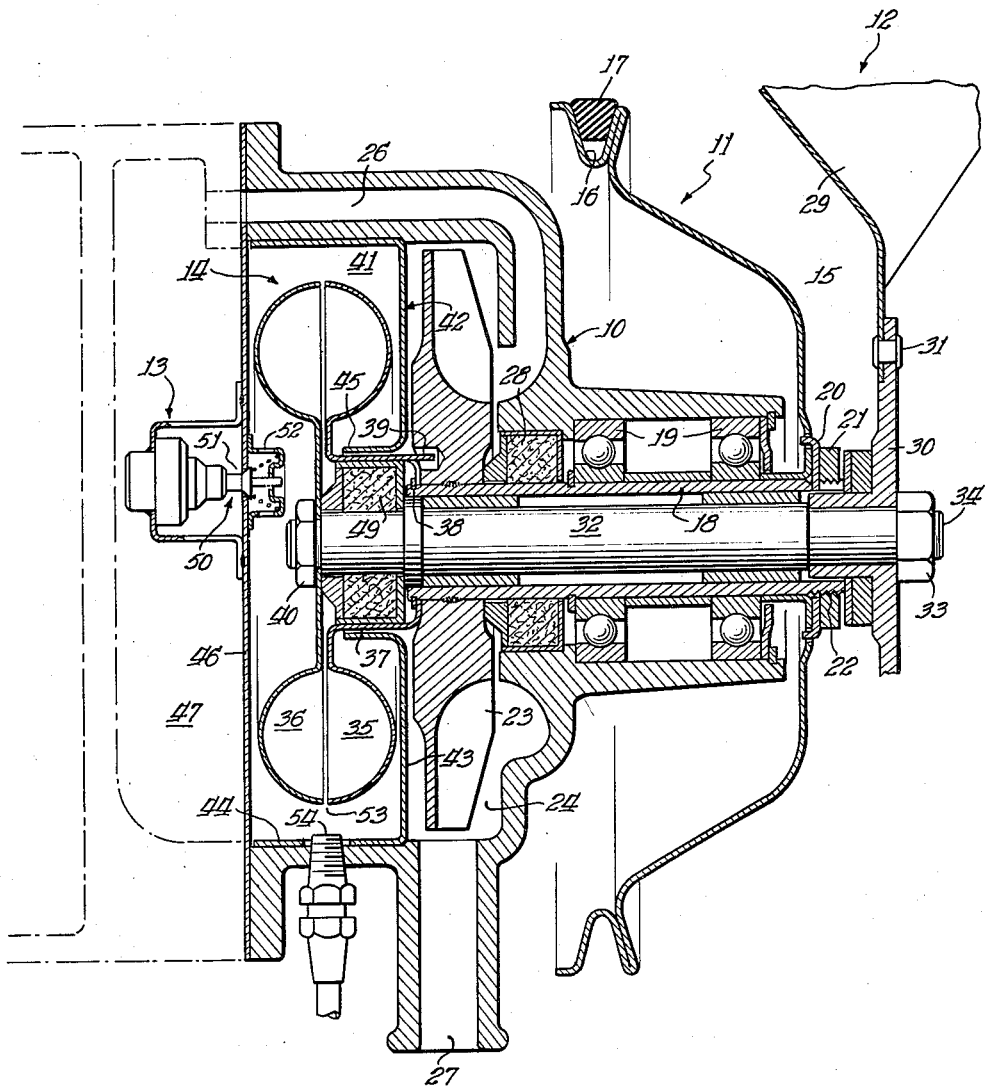
Inventor:
Harold Nutt
By: Donald W. Banner
Atty

United States Patent Office 2,837,069
Patented June 3, 1958

2,837,069

VARIABLE SPEED FAN DRIVE

Harold Nutt, Chicago, Ill., assignor to Borg-Warner Corporation, Chicago, Ill., a corporation of Illinois Application November 30, 1956, Serial No. 625,270

1 Claim. (Cl. 123—41.12)

This invention relates to a motor cooling system and more particularly to a variable speed automobile engine fan drive controlled by a thermostatic control and a fluid coupling.

Most automobiles today are provided with a constantly operating fan to draw cooling air through a radiator core to be passed over the engine for purposes of cooling the engine. The speed of rotation of this fan is entirely dependent upon and proportional to the R. P. M.'s of the engine. Consequently, even at high road speeds, when the cooling effect of the fan is usually needed the least, the fan rotates at a high speed and unnecessarily utilizes power. Therefore, it would be feasible to have the fan disconnected or its speed at least reduced in such a case in order to conserve power, reduce wear and tear on the fan, and reduce fan noise.

It is an object of the present invention to provide a variable speed fan drive for use primarily in a vehicle engine cooling system which will permit the reduction of the speed of the fan or complete disconnection of the fan as the cooling requirement becomes less.

Another object of this invention is to provide a fluid coupling, the driven member of which is connected to the fan and operates in response to a change in the temperature of the liquid cooling medium of the engine.

Another object of this invention is to vary the speed of the automobile fan by providing a thermo-responsive means to control the amount of fill of a fluid coupling in order to drive the fan at different speeds in relation to the cooling requirement of the engine.

A further object of this invention is to provide in an engine cooling system a fluid coupling device wherein the driving member thereof is connected to the circulating water pump, the driven member is connected to the cooling fan, and the coupling effect of the fluid coupling is controlled by a thermostat which governs the fill of the fluid coupling.

Still another object of this invention is to provide in an engine cooling sytem a device having a fluid coupling chamber, a fluid coupling located in the fluid coupling chamber, and a thermostatic control, wherein the driving member of the fluid coupling is connected to a circulating water pump, the driven member is connected to the cooling fan and the relationship of the area of the inlet to and the outlet from the fluid coupling chamber is a control factor in determining the speed of the cooling fan.

The invention consists of the novel constructions, arrangements and devices to be hereinafter described and claimed for carrying out the above stated objects and such other objects as will appear from the following description of the accompanying drawing which is a sectional view illustrating a fan drive mechanism embodying the principles of my invention.

Referring now to the drawing, the illustrated mechanism comprises a water pump housing 10, a water pump assembly 11, a cooling fan 12, a thermostatic control unit 13 and a fluid coupling 14.

The water pump assembly 11 comprises a pulley 15 having a peripheral groove 16 and adapted to be driven by a V-belt 17 running in the groove 16. The pulley 15 is driven from the engine (not shown) by the V-belt 17. The pulley 15 is attached to a sleeve shaft 18, the latter being mounted for rotation within the pump housing 10 by means of anti-friction bearings 19. The pulley 15 is secured to one end of the shaft 18 by means of a tongued washer 20 and a pulley clamp nut 21 which screws onto an extended threaded portion 22 of the shaft 18. The portion 22 has a plurality of axially extending slots which receive radially inwardly projecting lugs which form an integral part of the inner circumference of the tongued washer 20. The rotation of the pulley 15 is thus transmitted to the shaft 18 through the tongued washer 20. A series of water pump blades 23 are fixedly attached—as by brazing—to the other end of the sleeve shaft 18. The blades 23 rotate within a chamber 24 formed in the housing 10. The chamber 24 is connected with a water inlet (not shown) from the engine (not shown) by means of a passage 26. The chamber 24 is also connected with a water outlet 27 to the radiator (not shown). Suitable sealing means 28 prevents leakage of water from the vicinity of the water pump blades 23 along the sleeve 18.

The cooling fan 12 comprises a number of fan blades 29 of common construction secured to a fan hub 30 by a number of rivets 31 or other suitable means. The hub 30 is secured to a shaft 32 either by a key or spline and a nut 33 screwed onto an extended threaded portion 34 of the shaft 32, the rear portion of hub 30 engaging a suitable shoulder formed integrally on the shaft 32. The shaft 32 is mounted for rotation within the sleeve shaft 18, suitable bearing means being disposed therebetween.

The fluid coupling 14 comprises a driving member 35 and a driven member 36, each of these members being of common vane type construction. The driving member 35 is attached to the sleeve shaft 18 through the hub 37 of member 35, a retaining ring 38 and a series of hub projections 39 of the hub 37 which extend into the base of the blades 23. By virtue of the projections 39 connecting the driving member 35 and water pump blades 23, the member 35 and pump blades 23 always rotate at the same speed. The driven member 36 is attached to the shaft 32 at the end thereof opposite the fan hub 30 by means of a retaining nut 40. The two members of the fluid coupling 14 rotate within a fluid coupling chamber 41 of the housing 10.

The chamber 41 is defined by a metal circumferential line 42 disposed within the housing 10. The liner 42 comprises a disc 43 in a plane perpendicular to the shaft 32 and having a peripheral flange 44 perpendicular to the disc 43 and an internal flange 45 also perpendicular to the disc 43 and extending in the same direction as the peripheral flange 44. The chamber 41 is further defined by a plate 46 attached to the housing 10 and separating the chamber 41 from a cavity 47, the latter being connected with the water inlet (not shown) from the engine (not shown) and the passage 26.

The internal flange 45 is disposed in an abutting concentric relationship with, and forms an outside bearing surface for, the hub 37 of driving member 35 of the fluid coupling 14. Suitable sealing means 49 between the hub 37 and the shaft 32 prevents water seepage due to hydro-static pressure from the fluid coupling 14 along the shaft 32.

The thermostatic control unit 13, preferably a commercial Vernatherm unit comprises in part, a small capsule of material sensitive to temperature changes. The unit 13 is disposed within the cavity 47 which receives circulating cooling water from the engine (not shown).

The unit 13 responds to temperature changes of the water coming from the engine to operate a spring-biased valve 50 which normally engages a valve inlet opening 51 in plate 46 and controls the admission of fluid into the chamber 41 through apertures 52. Water flows from the chamber 41 into the fluid coupling 14 through the clearance 53 between the two members 35 and 36. A fluid coupling vent 54 leads from the chamber 41 to the top of the radiator (not shown).

During the operation of the engine of the automobile, the pulley 15 is constantly driven so that the water pump blades 23 connected thereto through the shaft 18 circulate water from the engine to the radiator. In addition, the driving member 35 is rotated at all times with the pulley 15 by virtue of its connection thereto through the hub 37, hub projections 39, shaft 18 and washer 20. Until the water in the circulatory system becomes heated to a certain minimum temperature, however, the cooling fan 12 does not revolve, because the thermostatic control unit 13 has not been actuated to permit water to enter the chamber 41 and the coupling 14 so as to drive the member 36. However, when the temperature of the circulating water flowing into the cavity 47 becomes high enough, it actuates the thermostatic control unit 13 which operates to open the valve 50 thus permitting water to flow from the cavity 47 through the valve inlet 51 and the apertures 52 into the chamber 41. As the water level in the chamber 41 rises the coupling 14 fills through the clearance 53 between the two members 35 and 36. Up to this time the driven member 36 of the fluid coupling has not been rotating so that the cooling fan 12 attached to the driven member 36 by means of the shaft 32 also has not been rotating. It should be explained here that the rate of entry of the water or other circulating medium into the chamber 41 is governed by the position of the spring biased valve 50 controlling the amount of opening of the valve inlet 51. The vent 54 from the chamber 41 is a much smaller effective area than the maximum effective area of the valve inlet 51 into the chamber 41. Preferably, the effective area of vent 54 should be about 25% of the maximum effective area of valve inlet 51. Therefore, when the valve 50 is opened to a maximum, the flow of water into the chamber 41 will be much greater than can be discharged at the vent 54, thus permitting the chamber 41 to fill up and the water to flow through the clearance 53 into the fluid coupling 14. As the fluid coupling 14 fills with water, the driven member 36 thereof tends to be driven at an increasingly faster speed by the fluid which is circulated by the rotation of the driving member 35. When the coupling 14 is completely filled, there is practically no slippage between the driving and the driven members so that the driven member 36 and the fan 12 connected thereto are driven at approximately the same speed as the driving member 35.

When the temperature of the water in the vehicle cooling system decreases sufficiently, the thermostatic control unit 13 responds to this change in temperature and gradually permits the closing of the spring biased valve 50. With a gradual decrease of the amount of water entering the coupling chamber 41 there comes a time during the operation of the closure of the valve 50 when the water entering through the valve inlet 51 becomes less than the amount discharged through the vent 54. Centrifugal force gradually forces water out of the fluid coupling 14 through the clearance 53 between the driving and driven members into the chamber 41 and out through the vent 54. Then, as the water level in chamber 41 falls sufficiently, the coupling action between the driving member 35 and the driven member 36 is gradually lessened so that the driven member 36 and the fan 12 connected thereto gradually decrease in speed of rotation. Eventually, as the fluid coupling 14 becomes completely devoid of water the driven member 36 and the fan 12 will cease to operate altogether.

Of course, it will be understood that the cycle of completely filling and completely emptying the fluid coupling 14 will not normally occur. Generally the cooling requirements of the engine will be such that the filling and emptying of the fluid coupling 14 will assume no predetermined cycle but that partial filling and emptying thereof will occur in an irregular pattern.

Therefore, it will be recognized from the above description that the thermostatically controlled fluid coupling device for varying the speed of the cooling fan advantageously provides a gradual cutting in and out of the cooling fan according to the cooling requirements of the engine. It also advantageously reduces fan noise which is sometimes prevalent during the operation of a cooling fan. Also the power normally absorbed by a continuously rotating fan is substantially reduced by this invention. Furthermore, the cutting in and out of the fan is done gradually so that there is no rapid change in the fan noise level. It will be noted that the speed of rotation of the cooling fan will depend upon the amount of fill in the fluid coupling 14 which in turn is determined by the temperature of the circulating water acting on the thermostatic control unit 13 which controls the amount of opening of the valve inlet 51. The speed of the fan, therefore, may vary from zero to a speed equal to that of the pump assembly 11, and all intermediate speed changes are accomplished gradually depending on the changing fill of the fluid coupling.

I wish it to be understood that my invention is not to be limited to the specific constructions and arrangements shown and described, except only insofar as the claim may be so limited, as it will be understood to those skilled in the art that changes may be made without departing from the principles of the invention.

I claim:

A fan control system comprising rotatable driving means, tubular shaft means, means connecting said driving means to said shaft means comprising a tongued washer and a clamp nut whereby said driving means and tubular shaft means are connected together for common rotation, a pump impeller fixedly mounted on said tubular shaft means at a position spaced from said driving means, fluid coupling means comprising a driving member and a driven member, means on said driving member and said pump impeller connecting said driving member and said impeller together for common rotation, rotatable shaft means disposed within said tubular shaft means, means fixedly connecting said driven member to one end of said rotatable shaft means, fan means, means connecting said fan means to said rotatable shaft means at the end thereof opposite said driven member whereby rotation of said driven member effects rotation of said fan means, means defining a fluid coupling chamber surrounding said fluid coupling means, aperture defining means in said last mentioned means, fluid receiving means in communication with said aperture, a thermally responsive valve responsive to the temperature of fluid in the fluid receiving means adapted to control the flow of fluid through said aperture, and opening defining means in said chamber defining means, the maximum effective area of which is approximately 25% of the maximum effective area of said aperture.

References Cited in the file of this patent

UNITED STATES PATENTS

| 2,406,486 | Bonham | Aug. 27, 1946 |
| 2,594,460 | Lauck | Apr. 29, 1952 |

FOREIGN PATENTS

| 882,110 | France | Feb. 15, 1943 |

OTHER REFERENCES

Diesel Power, May 1956, pages 59, 60.